United States Patent Office 3,842,033
Patented Oct. 15, 1974

3,842,033
FLAME RETARDANTS FOR POLYMERS
Donnie G. Brady, Ernest A. Zuech, and Roy A. Gray, Bartlesville, Okla., assignors to Phillips Petroleum Company, Bartlesville, Okla.
No Drawing. Continuation-in-part of abandoned application Ser. No. 146,456, May 24, 1971. This application Aug. 8, 1973, Ser. No. 386,576
Int. Cl. C08f 45/46
U.S. Cl. 260—45.75 B                                     10 Claims

ABSTRACT OF THE DISCLOSURE

A flame retardant for polymeric compositions which comprises a brominated 2,2-bis(4-allyloxyphenyl)propane or homologues thereof.

---

This application is a continuation-in-part of copending application Ser. No. 146,456, filed May 24, 1971, now abandoned.

This invention relates to flame retardants for polymers.

In one of its more specific aspects, this invention relates to brominated compounds suitable for inclusion in olefin polymers as flame retardants.

Because of the wide use of normally combustible polymers, flame retardants which act to prohibit their burning are important compounds for inclusion in polymers. This invention provides brominated compounds which are includable for this purpose in polymers of a wide variety and which are operable in the presence of a wide variety of other additives such as colorants, stabilizers, plasticizers and the like which are normally included in polymeric compositions.

According to this invention, there is provided a flame retardant for incorporation in polymeric compositions which comprises a compound having the general formula.

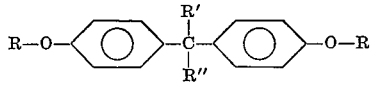

in which each R is a brominated radical selected from the group consisting of 2,3-dibromohydrocarbyl radicals containing 3 to 20 carbon atoms, and in which R' and R" are hydrogen, alkyl, aryl and cycloalkyl radicals and combinations thereof containing up to 12 carbon atoms. Preferably, R is a 2,3-dibromo alkyl radical containing 3–10 carbon atoms, each R' and R" are hydrogen or alkyl radicals having 1–6 carbon atoms and the sum of all the carbon atoms in the R, R', and R" groups does not exceed 30, most preferably R' and R" are said 1–6 carbon atom alkyl radicals. Among the novel compounds having this general formula is 2,2-bis[4-(2,3-dibromopropoxy)phenyl]propane.

This specific novel compound has been prepared and found to exhibit a desirable combination of properties. The organic chemist will appreciate that the terminal hydrocarbyl radicals in the molecule can be replaced by other similar hydrocarbyl radicals to produce similar compounds having similar properties. Because of ease and convenience of preparation, a preferred class of invention compounds can be represented by

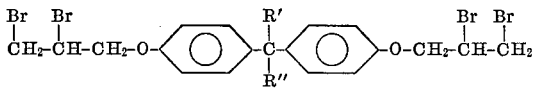

wherein R' and R" are as previously defined.

The compounds of this invention can be effectively employed in many types of resins or polymers including polyolefins, polyamides, polystyrenes, and the like including polypropylene, polyethylenes, and others. The invention flame retardant additive has been specifically demonstrated to be effective in a polypropylene resin. Those skilled in the flame retardant art will conclude that the additive can be used with advantage in other resins as well, particularly in other hydrocarbon resins such as polyethylene, polystyrene, polybutenes, polyolefin copolymers, and the like. The invention additive is presently believed to be most useful in resins comprising polymers and copolymers of polymerizable olefins including styrene.

The compounds of this invention can be employed in such compositions in the presence of antioxidants but the efficacy of the compounds of this invention does not depend upon the inclusion of such antioxidants in the polymer. Other suitable additives can also be present in the polymer compositions. These can include fire retardant synergists such as antimony trioxide, stabilizers such as organotin carboxylates or epoxidized soybean oil, ultraviolet stabilizers, pigments, and the like.

The comopunds of this invention are incorporated in the polymeric composition in an amount within the range of about 0.5 to about 15 parts by weight per hundred parts by weight of the resin and preferably in an amount within the range of 1–3 parts. The brominated compound can be contained in the polymeric composition in the presence of antimony oxide, the weight ratio of brominated compound to antimony oxide being from about 0.1 to 1 to about 10 to 1 with the preferred ratio being about 2 to 1.

The brominated compound can be introduced into the resin in any manner and at any stage of the formulation of the polymeric composition.

One convenient method for preparing the novel flame retardant compositions of the present invention is to contact a suitable diphenol compound with a suitable allyl halide or hydrocarbyl-substituted allyl halide under conditions of a Williamson Ether Synthesis reaction. That is, the diphenol compound, preferably in the presence of an equivalent amount of an alkali hydroxide, is contacted with the allyl halide compound and heated, preferably in the presence of a suitable solvent, at a temperature and for a time sufficient to form the corresponding diether compound. The unsaturated diether intermediate is then contacted with elemental bromine under suitable bromination conditions. Such bromination readily occurs and can be carried out at any convenient temperature, generally in a suitable solvent under conditions well known in the bromination art.

Suitable diphenol compounds are bisphenol A and compounds similar to bisphenol A. Of particular interest are diphenol compounds which can be conveniently prepared by reaction of phenol with a ketone. Thus, some suitable diphenol compounds in addition to bisphenol A are 2,2-bis(4-hydroxyphenyl)butane, 3,3 - bis(4 - hydroxyphenyl)hexane, and the like. Suitable allyl halide compounds are allyl chloride and homologs such as 2-butenyl chloride, 2-pentenyl bromide, 5-cyclohexyl-2-hexenyl iodide, and the like. Because compounds containing more carbon atoms than the allyl halide tend to produce significant amounts of isomers when reacted with suitable diphenol compounds, allyl halides, particularly allyl chloride, are presently preferred.

Some examples of novel flame retardant compounds which fall within the scope of the present invention are:

2,2-bis[4-(2,3-dibromopropoxy)phenyl]propane
3,3-bis[4-(2,3-dibromopentoxy)phenyl]hexane
1-cyclohexyl-2,2-bis[4-2,3-dibromoheptoxy)phenyl]butane
1,1-bis[4-(2,3-dibromopropoxy)phenyl]methane
2-o-tolyl-3,3-bis[4-(2,3-dibromodecoxy)phenyl]pentane
13,13-bis[4-(2,3-dibromopropoxy)phenyl]pentacosane
2,2-dimethyl-5,5-bis[4-(2,3-dibromopropoxy)phenyl]nonane
2,2-bis[4-(2,3-dibromopropoxy)phenyl]butane
and the like.

Thus flame retardants of this invention can be prepared by treating bisphenol A with allylic halides followed by bromination. Intermediate separation of the diallyl ether prior to bromination is not required.

The following illustrates one method of preparing the compounds of this invention and their flame retardant effect in polymer compositions.

EXAMPLE I

To about 120 parts by weight of ethanol were added 3.6 parts by weight of sodium hydroxide. After dissolution of the sodium hydroxide, 9.1 parts by weight of bisphenol A were added; 9.4 parts by weight of allyl chloride were then added and the mixture was refluxed for a period of ten hours after which it was cooled and water washed. About 140 parts by weight of ether were added, the organic layer was separated and the ether layer was dried over $MgSO_4$ and filtered. The ether was evaporated under vacuum to yield 2,2-bis(4-allyloxyphenyl)propane.

Ten (10) parts by weight of 2,2-bis(4-allyloxyphenyl) propane were added to about 75 parts by weight of chloroform. The resulting solution was cooled to 0° C. and 0.2 part by weight of sodium carbonate was added. To the mixture a solution of 10.5 parts by weight of bromine in about 75 parts by weight of chloroform was added during a period of one hour. The resulting mixture was agitated for another hour and then washed with aqueous sodium bicarbonate solution.

The organic layer was dried, filtered and the liquid was evaporated under reduced pressure to leave about 20.5 parts by weight of a colorless oil, that slowly crystallized at room temperature. Upon recrystallization from ethanol, 12 g. of a white crystalline compound were obtained. This material had a melting point of 75–78° C., and was analyzed as containing 40.07 wt. percent C., 3.86 wt. percent H and 52.0 wt. percent Br, identifiable as 2,2-bis[4-(2,3 - dibromopropoxy)phenyl]propane. The infrared spectrum and the nuclear magnetic resonance (NMR) examination of the compound were entirely consistent with the indicated structure. Some specifically confirmatory items on the NMR trace were: a peak at about 7 p.p.m. with a corresponding integrated area indicating the presence of eight aromatic protons; a peak at about 1.65 p.p.m. showing the presence of two methyl groups; a doublet at about 3.9 indicating two methylene groups attached to oxygen atoms; a doublet at about 4.35 representing protons on the bromine-containing carbon atom with the integrated area showing a total of six hydrogen atoms.

EXAMPLE II

The 2,2-bis[4-(2,3 - dibromopropoxy)phenyl]propane prepared in Example I was incorporated in polypropylene in an amount of 2 phr. (Sample I). For comparative purposes, a commercially available polymer flame retardant, 2,3-dibromopropyl-2,4,6 - tribromophenyl ether was individually incorporated in a comparable polypropylene composition (Sample II). Each composition also contained antimony trioxide in an amount of 1 phr. and a hindered phenol antioxidant in an amount of 0.3 weight percent.

The minimal volume fraction of oxygen required in an oxygen-nitrogen atmosphere to sustain burning of the polymeric composition was then determined for each of the two samples after various aging periods at 100° C. as a measure of flammability of the polymeric materials. Results were as follows:

|  | Minimal volume oxygen | |
| --- | --- | --- |
|  | Sample I | Sample II |
| Aging time: | | |
| Initial | 0.245 | 0.250 |
| 7 days | 0.242 | 0.188 |
| 14 days | 0.242 | 0.183 |
| 21 days | 0.242 | 0.183 |

The above data indicate that the brominated composition of this invention when incorporated in the polymer imparted to the polymer substantially unchanging susceptibility to flammability with aging, with the polymer remaining flame-retarded over the entire aging period, samples having test values less than 0.21 being considered as flammable, samples having test values greater than 0.21 being considered as flame retarded.

Thermal stability tests of polymer compositions containing the brominated compounds of this invention indicated that less polymer degradation occurred than in compositions containing a commercially-available flame retardant. For example, in two comparable blends in polypropylene having a melt flow of 4.0, incorporation of 2,2 - bis[4 - (2,3 - dibromopropoxy)phenyl]propane in amounts of 2 parts per hundred parts of resin produced compositions having melt flow values of 6.9 and 6.5, respectively, whereas incorporation of a commercially-recognized flame retardant, 2,3-dibromopropyl-2,4,6-tribromophenyl ether in amounts of 2 parts per hundred parts of the same resin, produce compositions having melt flow values of 20.9 and 11.3, respectively, other conditions being identical and all melt flow values being determined by ASTM D 1238–62T, Condition (L).

EXAMPLE III

Still another comparison was made which demonstrated the high thermal stability of polymers which contain the brominated compounds of the present invention. Individual samples of polypropylene of 4 melt flow containing 2 phr. fire-retardant additive and 1 phr. antimony trioxide were heated 10 minutes at the indicated temperature and then examined for color and melt flow.*

|  | 460° F. | | 480° F. | | 500° F. | |
| --- | --- | --- | --- | --- | --- | --- |
| Fire-retardant additive | Color | M.F. | Color | M.F. | Color | M.F. |
| Invention [1] | White | 4.8 | White | 10.3 | Off-white | 8.7 |
| Comparison [2] | Off-white | 7.5 | Light gray | 13.1 | Light gray | 28.8 |

[1] Invention additive is 2,2-bis[4-(2,3-dibromopropoxy)phenyl]propane.
[2] Comparison additive is 2,2-bis[2,3,5,6-tetrabromo-4-(2,3-dibromopropoxy)phenyl]propane.

The results in the Table clearly show that the invention polymer system was more resistant to thermal discoloration than the closely related comparison material. In addition, the invention polymer system exhibited much less degradation at high temperatures as evidenced by the relatively small change in melt flow from that of the original polymer.

Although the invention polymer system shows high thermal stability with only the brominated compound and the antimony oxide present, its stability can, of course, be still further increased by the additional presence of conventional anti-oxidants and other stabilizers.

While the compounds of this invention have been illustrated in conjunction with certain materials, the use of the compounds of this invention is not to be considered as being limited thereto.

*ASTM D 1238–62T (Condition L).

It will be evident that various modifications can be made to the method of this invention. Such are, however, considered to be within the scope of the invention.

What is claimed is:

1. A polymeric composition comprising:
   (a) a polymer selected from the group consisting of polyolefins, polyamides, and polystyrenes; and
   (b) 0.5 to 15 parts by weight per 100 parts by weight of said polymer of a compound having the general formula

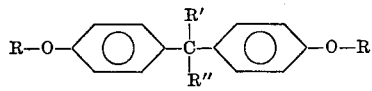

wherein R is a 2,3-dibromo alkyl radical containing 3–10 carbon atoms, and R' and R" are hydrogen or alkyl radicals having 1–6 carbon atoms.

2. A composition according to claim 1 comprising in addition antimony oxide in a weight ratio of said compound to said antimony oxide of 0.1:1 to 10:1.

3. A composition according to claim 2 wherein said compound is present within the range of 1 to 3 parts by weight of said compound per 100 parts by weight of said polymer.

4. A composition according to claim 3 wherein said compound has the general formula

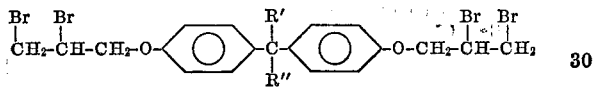

5. A composition according to claim 4 wherein said compound is 2,2-bis[4-(2,3-dibromopropoxy)phenyl]propane.

6. A composition according to claim 5 wherein said polymer is polypropylene.

7. A composition according to claim 5 wherein said polymer is a polyolefin.

8. A composition according to claim 7 wherein said compound is present in an amount within the range of 1–3 parts by weight per 10 parts by weight of said polymer.

9. A composition according to claim 8 wherein there is present in addition a hindered phenol antioxidant.

10. A composition according to claim 9 wherein the ratio of said compound to said antimony oxide is about 2 to 1.

References Cited

UNITED STATES PATENTS 3,660,351    5/1972    Schmidt et al. _____ 260—45.85

MELVYN I. MARQUIS, Primary Examiner

U.S. Cl. X.R.

260—45.7 R, 45.95 G, 613

UNITED STATES PATENT OFFICE
CERTIFICATE OF CORRECTION

Patent No. 3,842,033   Dated: Oct. 15, 1974

It is certified that error appears in the above-identified patent and that said Letters Patent are hereby corrected as shown below:

Column 6, line 10, "10" should be --- 100 ---.

Signed and sealed this 31st day of December 1974.

(SEAL)
Attest:

McCOY M. GIBSON JR.
Attesting Officer

C. MARSHALL DANN
Commissioner of Patents